UNITED STATES PATENT OFFICE.

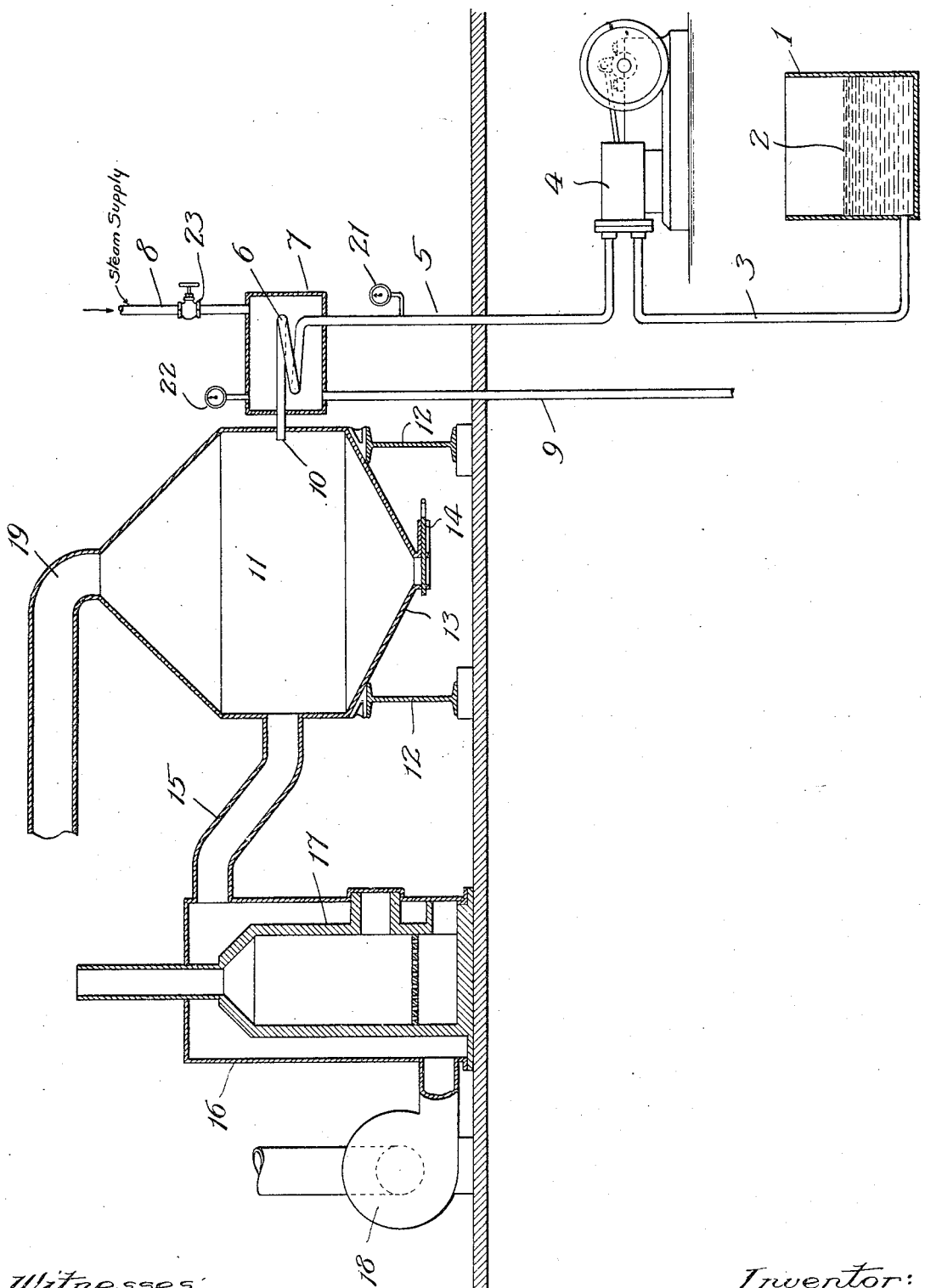

GEORGE ARTHUR BUHL, OF CHICAGO, ILLINOIS, ASSIGNOR TO THE G. A. BUHL COMPANY, OF CHICAGO, ILLINOIS, A CORPORATION OF ILLINOIS.

METHOD OF OBTAINING SOLID SUBSTANCES FROM SOLUTIONS CARRYING THE SAME.

1,322,875. Specification of Letters Patent. Patented Nov. 25, 1919.

Application filed July 8, 1915. Serial No. 38,670.

*To all whom it may concern:*

Be it known that I, GEORGE ARTHUR BUHL, a citizen of the United States, residing at Chicago, in the county of Cook and State of Illinois, have invented new and useful Improvements in Methods of Obtaining Solid Substances from Solutions Carrying the Same, of which the following is a specification.

My invention relates to improvements in methods of obtaining solid substances from solutions carrying the same, and is more particularly described in the following detailed specification. In this specification reference will be had to the accompanying drawing, which shows schematically one form of apparatus adapted for carrying out my process.

In the drawing, the numeral 1 designates a supply tank containing a solution 2 of the solids which are to be freed from the solvent. From the supply tank 1 a pipe 3 leads to a liquid pump 4, and from the latter a pressure pipe 5 conducts the solution 2 to a heating coil 6, which is preferably mounted within a heating chamber 7. The chamber 7 may conveniently be heated by fluid under pressure, as by steam which may be supplied from a pipe 8, the water of condensation or exhaust steam passing out of the box or heating chamber by a pipe 9. At the end of the heating coil 6 there is provided a nozzle 10, which discharges into the expansion chamber 11, suitably mounted upon supports 12 and having a hopper-bottom 13 provided with a gate-valve 14. The expansion chamber 11 may have supplied thereto a suitable heating fluid, such as heated air, which may enter through a conduit 15 leading from a jacket 16 surrounding a heating furnace 17, air being supplied to the jacket 16 under pressure, as by a blower 18. The outlet of the expansion chamber is shown as located in the top thereof and designated 19. A suitable pressure gage 21 may be applied to the conduit 5, which leads from the pump 4, to indicate the pressure within this conduit and the heating coil 6. A pressure-gage 22 communicating with the heating chamber 7 may be used for the purpose of indicating the pressure, and therefore the temperature, within this chamber. Suitable regulation of the temperature within the heating chamber 7 may be accomplished by providing a controlling valve 23 on the steam-supply pipe 8.

As will be seen the liquid in its passage from the supply tank to the nozzle 10, from which it discharges into the expansion chamber 11, is free from air, thus rendering the process applicable to the evaporation of many substances to which the continued contact with air while heating would be injurious, such, for instance, as the drying of converted starch solutions, solution of lactose or sugar of milk, fruit juices, and others which might be enumerated.

When using this apparatus for the carrying out of my invention, it will be operated in the following manner:

The solution, for instance, an aqueous sugar solution, will be placed within the supply tank 1. The pump 4 will then be operated to withdraw the solution from the tank 1, and force it under pressure through the conduit 5, heating coil 6, and out of the discharge-nozzle 10, the pressure being regulated by regulating the speed of the pump, or by any other well-known expedient. Steam, or other liquid or gaseous heating fluid will be supplied to the heating chamber 7 in order to heat the moving stream, or fluid, within the heating coil 6. It will be understood that the degree of heat and pressure made use of in the heating coil 6 will be dependent upon the nature of the solution under treatment and upon the particular result desired, as will later appear. The heated stream of fluid from the coil 6 will discharge from the nozzle 10 into the chamber 11, in which it will expand and become volatilized, the solid particles which are freed from the liquid by such volatilization falling to the hopper-bottom 13, in which they collect and from which they may be removed from time to time through the gate-valve 14. In order to assist in the complete volatilization of the fluid issuing from the nozzle 10, it may be desirable to apply heat to the expansion chamber 11, and this may conveniently be effected by continuously supplying a stream of heated air, which is blown in by the blower 18 and over the furnace 17, and thence through the conduit 15 to the expansion chamber 11. The volatilized products and the heated air will flow outward continuously through the conduit 19. The heat and pressure within the heating coil 6 may be accurately controlled by controlling the pump 4, and the supply of heating fluid which enters through the pipe 8, in order to obtain the best results from the entire process. For some solutions it is found advisable to use high temperatures and pressure within the heating coil 6, the high pressure preventing, to a large extent, the volatilization of any of the liquid within this coil or before its release from the nozzle 10. By maintaining the same temperatures, but by decreasing the pressure within the heating coil 6, a considerable proportion, up to substantially the entire amount, of the liquid may be volatilized and expanded within the coil, and the stream issuing from the nozzle 10 will be a mixture of vapor and finely divided liquid, or almost wholly vapor, depending upon the degree of heating and expansion within the coil and nozzle. The complete release of the pressure upon the liquid within the expansion chamber will, *per se*, act to volatilize any liquid constituents remaining in the discharging stream. Any additional heat needed to effect complete vaporization of the liquid and drying of the solid particles will, in the manner of carrying out the invention shown by the drawing, be supplied by the heated air entering through the conduit 15.

While I have described in detail one form of apparatus for carrying out my invention, and a specific manner in which the process of the invention may be performed with the use of this apparatus, it is to be understood that such showing and description is illustrative only, and for the purpose of rendering clearer the principles of my invention, and that I do not regard my invention as limited to the specific steps or the use of the apparatus shown and described, except in so far as such limitations have been included within the terms of the following claim, in which it is my intention to claim all novelty inherent in my invention as broadly as possible, in view of the prior art.

What I claim as new and desire to secure by Letters Patent is—

The herein described process of desiccating liquids which consists of the steps of forcing the liquid alone under pressure and free from air through a coil heated to a temperature above its boiling point where it is partially volatilized, discharging the partially volatilized liquid from the end of said coil into an expansion chamber where the solid particles are collected, simultaneously supplying a stream of desiccating atmosphere to said chamber at an angle in opposed relation to the incoming stream of partially volatilized liquid whereby the streams are thoroughly mixed, and withdrawing the vapors and desiccating atmosphere from said chamber.

GEORGE ARTHUR BUHL.

In presence of—
D. C. THORSEN,
O. C. AVISUS.